United States Patent
Li et al.

(10) Patent No.: US 9,471,049 B2
(45) Date of Patent: Oct. 18, 2016

(54) SYSTEM AND METHOD FOR CONFIGURING A FIELD DEVICE OF A CONTROL SYSTEM

(71) Applicant: General Equipment and Manufacturing Company, Inc., Louisville, KY (US)

(72) Inventors: Jingli Li, Lexington, KY (US); Charles E. Griffin, Jeffersonville, IN (US)

(73) Assignee: General Equipment and Manufacturing Company, Inc., Louisville, KY (US)

( * ) Notice: Subject to any disclaimer, the term of this patent is extended or adjusted under 35 U.S.C. 154(b) by 447 days.

(21) Appl. No.: 13/720,937

(22) Filed: Dec. 19, 2012

(65) Prior Publication Data
US 2014/0172121 A1 Jun. 19, 2014

(51) Int. Cl.
| | |
|---|---|
| G06F 19/00 | (2011.01) |
| G05B 15/02 | (2006.01) |
| G05B 19/042 | (2006.01) |
| H04W 4/02 | (2009.01) |
| H04L 29/08 | (2006.01) |

(52) U.S. Cl.
CPC ............ *G05B 15/02* (2013.01); *G05B 19/0426* (2013.01); *H04L 67/125* (2013.01); *H04W 4/02* (2013.01); *G05B 2219/25062* (2013.01); *G05B 2219/25428* (2013.01)

(58) Field of Classification Search
USPC ...... 700/231, 236, 90, 12, 17; 455/405, 407; 345/428, 440
See application file for complete search history.

(56) References Cited

U.S. PATENT DOCUMENTS

| | | | |
|---|---|---|---|
| 6,961,586 B2 * | 11/2005 | Barbosa et al. | 455/556.1 |
| 7,010,294 B1 * | 3/2006 | Pyotsia et al. | 455/420 |
| 7,262,693 B2 * | 8/2007 | Karschnia et al. | 340/508 |
| 7,593,751 B2 | 9/2009 | Barbosa et al. | |
| 7,783,330 B2 * | 8/2010 | Dobrowski et al. | 455/574 |
| 7,817,063 B2 * | 10/2010 | Hawkins et al. | 340/870.07 |
| 7,848,827 B2 * | 12/2010 | Chen | 700/19 |
| 8,224,256 B2 | 7/2012 | Citrano, III et al. | |
| 8,606,503 B2 * | 12/2013 | Rothschild | 701/408 |
| 8,766,794 B2 * | 7/2014 | Ferguson et al. | 340/539.13 |
| 2004/0192329 A1* | 9/2004 | Barbosa et al. | 455/456.1 |
| 2005/0164684 A1* | 7/2005 | Chen et al. | 455/414.1 |
| 2007/0123249 A1* | 5/2007 | Sun | 455/423 |
| 2008/0234837 A1 | 9/2008 | Samudrala et al. | |
| 2008/0250162 A1 | 10/2008 | Nixon et al. | |

(Continued)

OTHER PUBLICATIONS

The International Search Report and the Written Opinion of the International Searching Authority, dated Mar. 18, 2014, International Application No. PCT/US2013/075988 (11 pages).

(Continued)

*Primary Examiner* — Kidest Bahta
(74) *Attorney, Agent, or Firm* — Marshall, Gerstein & Borun LLP

(57) ABSTRACT

A system and method for configuring a field device of a control system is provided. The system includes a mobile computing device for communicating with a wireless adapter coupled to the field device. The mobile computing device receives an application module via a wireless network communication module. The application module, when executed by a processor, configures the field device via a wireless direct communication module. The mobile computing device includes a user-friendly graphic display to provide and receive information associated with the configuration of the field device.

14 Claims, 5 Drawing Sheets

(56) References Cited

U.S. PATENT DOCUMENTS

| | | | | |
|---|---|---|---|---|
| 2010/0290359 | A1* | 11/2010 | Dewey | G05B 19/4185 370/252 |
| 2012/0038458 | A1* | 2/2012 | Toepke | G05B 19/042 340/6.1 |
| 2012/0040698 | A1* | 2/2012 | Ferguson | G05B 19/042 455/457 |
| 2012/0041744 | A1* | 2/2012 | Kantzes | G05B 19/042 703/13 |
| 2012/0046911 | A1 | 2/2012 | Mathiowetz et al. | |
| 2012/0236769 | A1 | 9/2012 | Powell et al. | |
| 2013/0103989 | A1* | 4/2013 | Jensen | G06F 11/0793 714/47.2 |

OTHER PUBLICATIONS

"ValveLink™ Mobile Software," (2010). Also available at http://www2.emersonprocess.com/siteadmincenter/PM%20Asset%20Optimization%20Documents/ProductReferenceAndGuides/475_ru_VLquickstart.pdf.

"Bluetooth Setting Tool Installation Manual," Rotork Controls (2011).

"475 Field Communicator—Innovative Field Communicator," (2013). Retrieved from the Internet on Apr. 2, 2013: http://www.emersonprocess.com/en-US/brands/Field-Communicator/Pages/475FieldCommunicator.aspx.

"MCT202 Handheld Configurator," (2013). Retrieved from the Internet on Apr. 2, 2013: https://www.honeywellprocess.com/en-US/explore/products/instrumentation/transmitter-configuration-tools-and-accessories/Pages/mc-toolkit.aspx.

"ValveLink Mobile," (2013). Retrieved from the Internet on Apr. 2, 2013: http://www2.emersonprocess.com/en-US/BRANDS/FIELD-COMMUNICATOR/Pages/ValveLinkMobile.aspx.

The International Search Report and the Written Opinion of the International Searching Authority, dated Jun. 23, 2015, International Application No. PCT/US2013/075988 (7 pages).

* cited by examiner

SYSTEM AND METHOD FOR CONFIGURING A FIELD DEVICE OF A CONTROL SYSTEM

FIELD OF THE DISCLOSURE

This disclosure relates generally to control systems and, more particularly, to a system, device, and method for configuring and/or calibrating a field device used in a control system.

BACKGROUND

Control systems, which include process control systems and safety instrumented systems (SIS), typically implement one or more controllers to control the process or safety system. The controllers in these systems frequently use field devices to perform a variety of functions within the control environment. For example, in a level control system, the field devices may be used to control and/or monitor the amount of a liquid in a holding tank. When the level of the liquid has reached a predetermined position (high or low), the control system may respond by utilizing one of the field devices, such as a valve, to adjust the flow of liquid entering or exiting the holding tank.

In many control systems, the field devices are periodically configured or calibrated. Control system personnel commonly use a handheld device to configure or calibrate the field device. These control system personnel connect the leads extending from the handheld device to the field device, and then run, on the handheld device, an application module for configuring the field device.

In many instances, the field device is located in a remote area that is difficult and/or dangerous for control system personnel to reach. For example, the field device might be located under water or in a contaminated environment. Before arriving at the location of the field device, control system personnel must install the application module onto the handheld device. The application module may initially be stored on a library or database located at a remote location or on the Internet. Control system personnel must periodically connect the handheld device to the library or database to download new and modified application modules to the handheld device. In some instances, control system personnel must be granted permission to download the application module to the handheld device. The process of requesting and receiving permission to download the application module may take several days or weeks. With vast numbers of handheld devices being utilized to configure field devices in control systems throughout the world, there is a considerable amount of time and effort associated with regulating and controlling the versions of the application modules used with the handheld device.

SUMMARY

Example systems and methods to configure a field device in a control system are herein described. In accordance with a first exemplary aspect of the invention directed to a control system for controlling a process or safety condition, the control system includes a field device coupled to the process and arranged to adjust the process condition. A sensor is coupled to the process and arranged to monitor the process for an occurrence of an event trigger associated with the process condition. The control system also includes a wireless adapter operatively coupled to the field device, a remote device coupled to a wireless communication network and capable of storing one or more application modules, and a mobile computing device. The mobile computing device includes a processor, a memory device, a wireless network communication module, and a wireless direct communication module. The wireless network communication module is coupled to the processor and permits wireless communication between the mobile computing device and the remote memory device. The wireless direct communication module is coupled to the processor and permits direct wireless communication between the mobile computing device and the wireless adapter. The control system also includes an application module received from the remote device via the wireless communication network. When executed on the processor, the application module permits the mobile computing device to configure the field device via the wireless direct communication module.

In accordance with a second exemplary aspect of the invention directed to a control system having a field device for controlling a process or safety condition, the control system includes a mobile computing device having a processor for facilitating the configuration of the field device, a remote device coupled to a wireless communication network and capable of storing one or more application modules, a wireless adapter operatively coupled to the field device, and a wireless direct communication module capable of facilitating wireless direct communication between the mobile computing device and the field device. The control system also includes an application module received by the mobile computing device from the wireless communication network via the wireless communication network module, wherein when the application module is executed on the processor of the mobile computing device, the application module configures the field device via wireless direct communication established between the wireless adapter and the mobile computing device.

In accordance with a third exemplary aspect of the invention directed to a mobile computing device for configuring a field device of a control system, wherein the field device is capable of wireless communication, the mobile computing device comprises a processor for facilitating the configuration of the field device, a memory device coupled to the processor, a wireless network communication module permitting wireless network communication on a wireless communication network, and a wireless direct communication module permitting wireless direct communication between the mobile computing device and the field device. The mobile computing device also includes an application module received via the wireless network communication module, and when the application module is executed on the processor of the mobile computing device, the application module configures the field device via wireless direct communication established between the field device and the mobile computing device.

In accordance with a fourth exemplary aspect of the invention directed to a mobile computing device for configuring a field device of a control system, wherein the field device is capable of wireless communication, the mobile computing device comprises a processor for facilitating the configuration of the field device, and a wireless direct communication module that enables wireless direct communication between the mobile computing device and the field device. The mobile computing device also includes an application module, which when executed on the processor, configures the field device via wireless direct communication established between the field device and the mobile computing device, and an interface module including a display screen for facilitating interaction with the application module.

In further accordance with any one or more of the foregoing first, second, third, and fourth exemplary aspects, a control system and/or mobile computing device may further include any one or more of the following preferred forms.

In one preferred form, the mobile computing device includes a memory coupled to the processor and the application module is stored in the memory.

In another preferred form, the mobile computing device includes a message received via the wireless network communication module, wherein, the message includes information associated with the application module.

In another preferred form, the wireless adapter is integrated within the circuitry of the field device.

In another preferred form, the wireless adapter is internally or externally attached to the field device.

In another preferred form, the mobile computing device includes a positioning module capable of attaining the geographical or physical location of the mobile computing device.

In another preferred form, the application module is associated with the geographical or physical location of the mobile computing device and/or the geographical or physical location of the field device.

DETAILED DESCRIPTION

Figure 1:
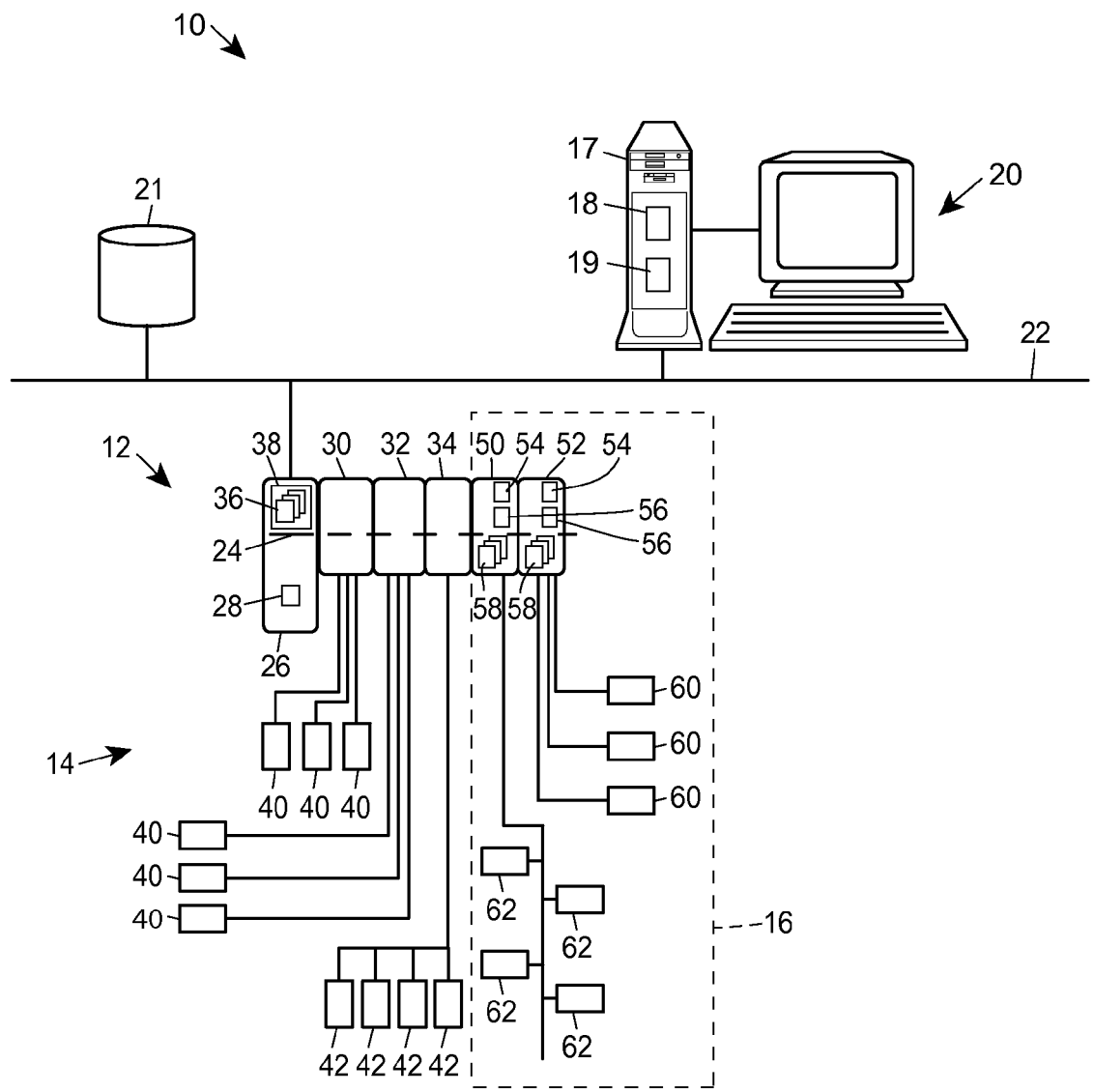
FIG. 1 is a block diagram of an exemplary process plant having a process control system and a safety system.

In FIG. 1, an example process plant 10 is shown to include a process control/safety control node 12, which may include a process control system 14 integrated with a safety system 16 (depicted within dotted lines). The safety system 16 generally operates as a safety instrumented system (SIS) and may monitor the operation of the process control system 14 to ensure the safe operation of the process plant 10. If necessary, the safety system 16 may override control of the process control system 14.

The process plant 10 also includes one or more workstations 17 or computing devices, which may be any type of computer, for example. Each workstation 17 may include a processor 18, a memory device 19, and/or a user interface 20 such as a display monitor and/or keyboard that are accessible to control system personnel. The workstation 17 is shown connected to the process control/safety control node 12 and to an external memory device 21 via a common communication line or bus 22. The communication bus 22 may be implemented using any desired bus-based or non-bus-based hardware, hardwired or wireless communication structure, or suitable communication protocol, such as an Ethernet protocol. Both process control system devices and safety system devices are operatively connected together via the bus structure, which may be provided on a common backplane 24 into which different process controllers and input/output devices are attached.

The process plant 10 also includes at least one process controller 26 having a processor 28 and one or more process control system input/output (I/O) devices 30, 32, 34. Each process control system I/O device 30, 32, 34 is communicatively connected to a set of process control related field devices, illustrated in FIG. 1 as controller field devices 40, 42. The controller 26, the I/O devices 30, 32, 34, and the field devices 40, 42 generally make up the process control system 14 of the process control/safety control node 12.

The process controller 26, which may be, by way of example only, a DeltaV™ controller sold by Emerson Process Management or any other desired type of process controller, is programmed to provide process control functionality using the I/O devices 30, 32, 34 and the field devices 40, 42. In particular, the processor 28 of the controller 26 implements or oversees one or more control processes or control strategies in cooperation with the field devices 40, 42 and the workstation 17 to control the process plant 10 or a portion of the process plant in any desired manner. The field devices 40, 42 may be any desired type, such as sensors, valves, transmitters, positioners, etc., and may conform to any desired open, proprietary, or other communication or programming protocol including, for example, HART utilizing 4-20 ma signals (as illustrated for the field devices 40), any bus protocol such as the Foundation® Fieldbus protocol (as illustrated for the field devices 42), or CAN, Profibus, and AS-Interface protocols, to name but a few. Similarly, each of the I/O devices 30, 32, 34 may be any known type of process control I/O device using any appropriate communication protocol.

The controller 26 may be configured to implement the control process or the control strategy in any desired manner. For example, the controller 26 may implement a control strategy using what are commonly referred to as function blocks, wherein each function block is a part or object of an overall control routine and operates in conjunction with other function blocks (via communications called links) to implement process control loops within the process control system 14. Function blocks typically perform one of: an input function such as that associated with a transmitter, a sensor, or other process parameter measurement device; a control function such as that associated with a control routine that performs PID, fuzzy logic, etc., control; or, an output function that controls the operation of some device such as a valve to perform some physical function within the process control system 14. Hybrids of these function blocks, as well as other types of function blocks, may also exist. While the description of the control system is provided herein using a function block control strategy that incorporates an object oriented programming paradigm, the control strategy or control routines or control loops or control modules could also be implemented or designed using other conventions, such as ladder logic or sequential function charts, for example, or using any other desired programming language or paradigm.

For the purposes of this disclosure, the terms control strategy, control routine, control module, control function block, safety module, safety logic module, and control loop essentially denote a control program executed to control the process or safety system and these terms may be interchangeably used herein. However, for the purposes of the following discussion, the term control module will be used. It should further be noted that control module described herein may have parts thereof implemented or executed on by different controllers or other devices if so desired. In addition, the control modules described herein to be implemented within the process control system 14 and/or the safety system 16 may take any form, including software, firmware, hardware, and any combination thereof. For example, the control modules, which may be control routines or any part of a control procedure such as a subroutine or parts of a subroutine (such as lines of code), may be implemented in any desired software format, such as using ladder logic, sequential function charts, control routine diagrams, object oriented programming, or any other software programming language or design paradigm. Likewise, the control modules described herein may be hard-coded into, for example, one or more EPROMs, EEPROMs, application specific integrated circuits (ASICs), programmable logic controllers (PLCs), or any other hardware or firmware elements. The control modules may be designed using any design tools, including graphical design tools or any other type of software/hardware/firmware programming or design tools.

One or more control modules 36, which may be stored in a memory 38 on the controller 26, may be executed on the processor 28 of the controller, which is typically the case when these function blocks are used or associated with standard 4-20 ma devices and some types of smart field devices such as HART devices. The control modules 36 may also be stored in other memory locations 19, 21 within the system 10 or implemented by the field devices 40, 42 themselves, which may be the case with Fieldbus devices.

The safety system 16 of the process control/safety control node 12 includes one or more safety system logic solvers 50, 52. Each of the logic solvers 50, 52 is a safety controller (also invariably referred to as an I/O device) having a processor 54 capable of executing safety logic modules 58. The safety logic modules 58, which may be similar to the control modules 36, may be stored in a memory device 56 of one or both logic solvers 50, 52. The logic solvers 50, 52 are communicatively connected to provide control signals to and/or receive signals from safety system field devices 60, 62. The safety controllers 50, 52 and the safety system field devices 60, 62 generally make up the safety system 16 of FIG. 1.

The safety field devices 60, 62 may be any desired type of field device conforming to or using any known or desired communication protocol, such as those mentioned above. In particular, the field devices 60, 62 may be safety-related field devices of the type that are conventionally controlled by a separate, dedicated safety-related control system, such as a liquid level detector or an emergency shutdown (ESD) valve. In the process plant 10 illustrated in FIG. 1, the safety field devices 60 are depicted as using a dedicated or point-to-point communication protocol, such as the HART protocol, while the safety field devices 62 are illustrated as using a bus communication protocol, such as a Fieldbus protocol. Generally, the safety devices (both the controllers 50, 52 and the safety system field devices 60, 62) used as part of the safety system 16 will be rated as safety devices, which typically means that these devices must go through a rating procedure to be rated by an appropriate body as a safety device.

The backplane 24 (indicated by a dashed line through the process controller 26, the I/O devices 30, 32, 34, and the safety controllers 50, 52) is used to connect the process controller 26 to the process control I/O cards 30, 32, 34 as well as to the safety controllers 50, 52. The process controller 26 is also communicatively coupled to the bus 22 and operates as a bus arbitrator to enable each of the I/O devices 30, 32, 34 and the safety controllers 50, 52 to communicate with the workstation 17 and/or the memory device 21 via the bus. The backplane 24 also enables the safety controllers 50, 52 to communicate with one another and coordinate safety functions implemented by each of these devices, to communicate data to one another, or to perform other integrated functions.

A display module (not shown) may be stored in the memory 19 of the workstation 17. However, if desired, the display module may be stored and executed in a different workstation or in another computing device associated with the process plant 10. The display module may be any type of interface that, for example, enables a user to manipulate data values (for example, perform reads or writes) to thereby alter operation of the control 36 or safety modules 58 within either or both of the control system 14 and the safety system 16. Thus, if a write is specified to be made to the control module 36 associated with the control system 12 or to one of the field devices 40, 42, for example, the display module enables that write to take place. Additionally, if the write is specified to be made to the safety logic module 58 associated with the safety system 16 or to one of the field devices 60, 62, for example, the display module enables that write to occur.

By and large, the control system of the present invention is configured to respond to a target or an occurrence of an event trigger associated with a process condition. A controller includes one or more control modules that may be executed by one or more processors to control the process via one or more field devices coupled to the process. Process or safety information is attained by the one or more field devices and provided to control system personnel and/or the controller, wherein the process or safety system may be adjusted, if necessary. For example, in a level detecting process employing a liquid holding tank, the controller may collaborate with one or more field devices to monitor the amount of liquid held within the tank and to control the amount of liquid retained within the tank by opening and/or closing an inlet and/or an outlet valve.

Figure 2:
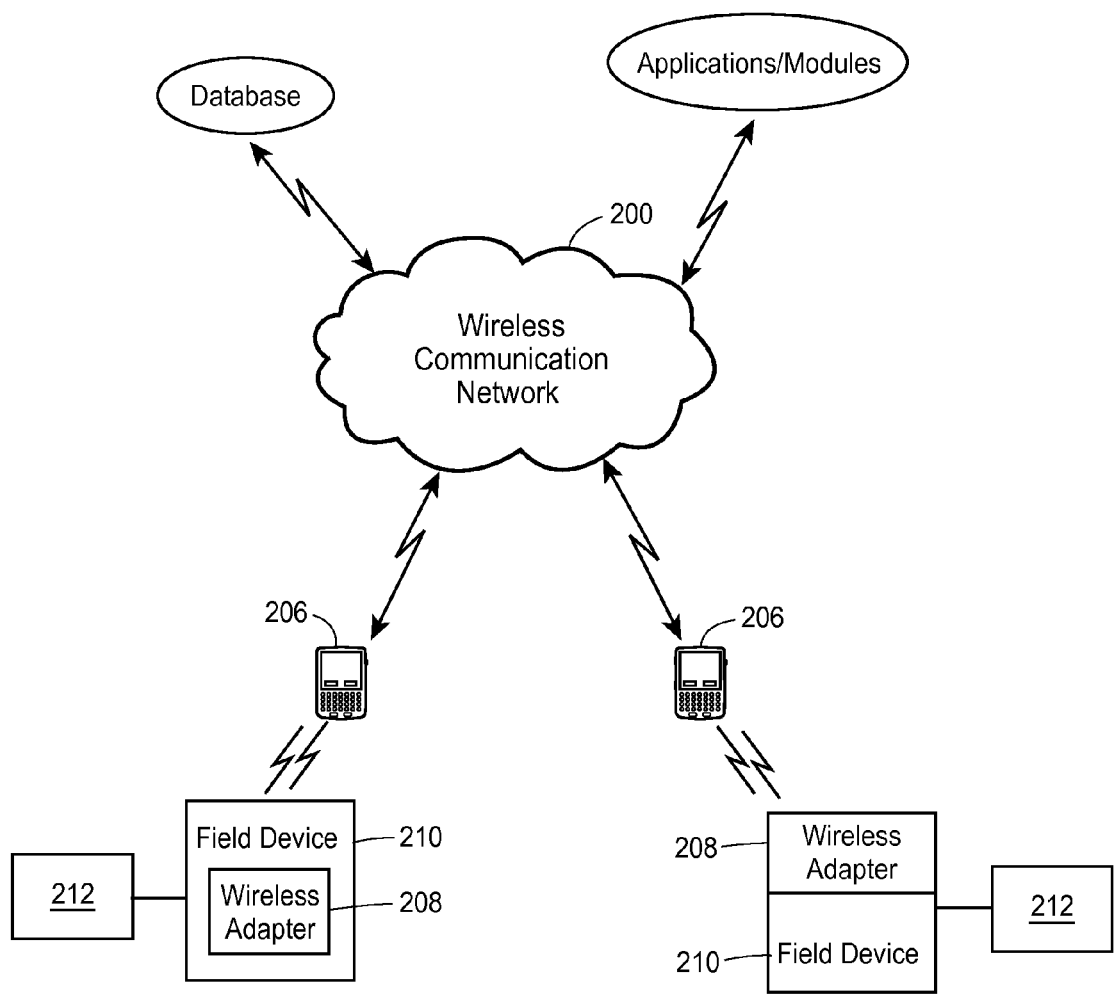
FIG. 2 is a block diagram illustrating an exemplary system topology assembled in accordance with the teachings of a disclosed embodiment.

Proper management of the control system requires control system personnel to configure the system's field devices. Although the field devices are configured during initial set-up of the control system or control loop, periodic adjustments or reconfigurations of the field device are typically implemented. As such, configuring a field device may include reconfiguring, calibrating, and recalibrating the field device. FIG. 2 depicts an exemplary embodiment of the invention wherein a wireless computing device 206 is utilized to configure a field device 210 of a control system 212. In particular, the wireless computing device 206 is capable of communicating over a wireless communication network 200 to a library, database, memory device, client device, server device, or repository to obtain an application module for configuring the field device 210. The wireless computing device 206 is also capable of communicating directly with the field device 210 via a wireless adapter 208, which facilitates the execution of the application module to configure the field device.

Figure 3:
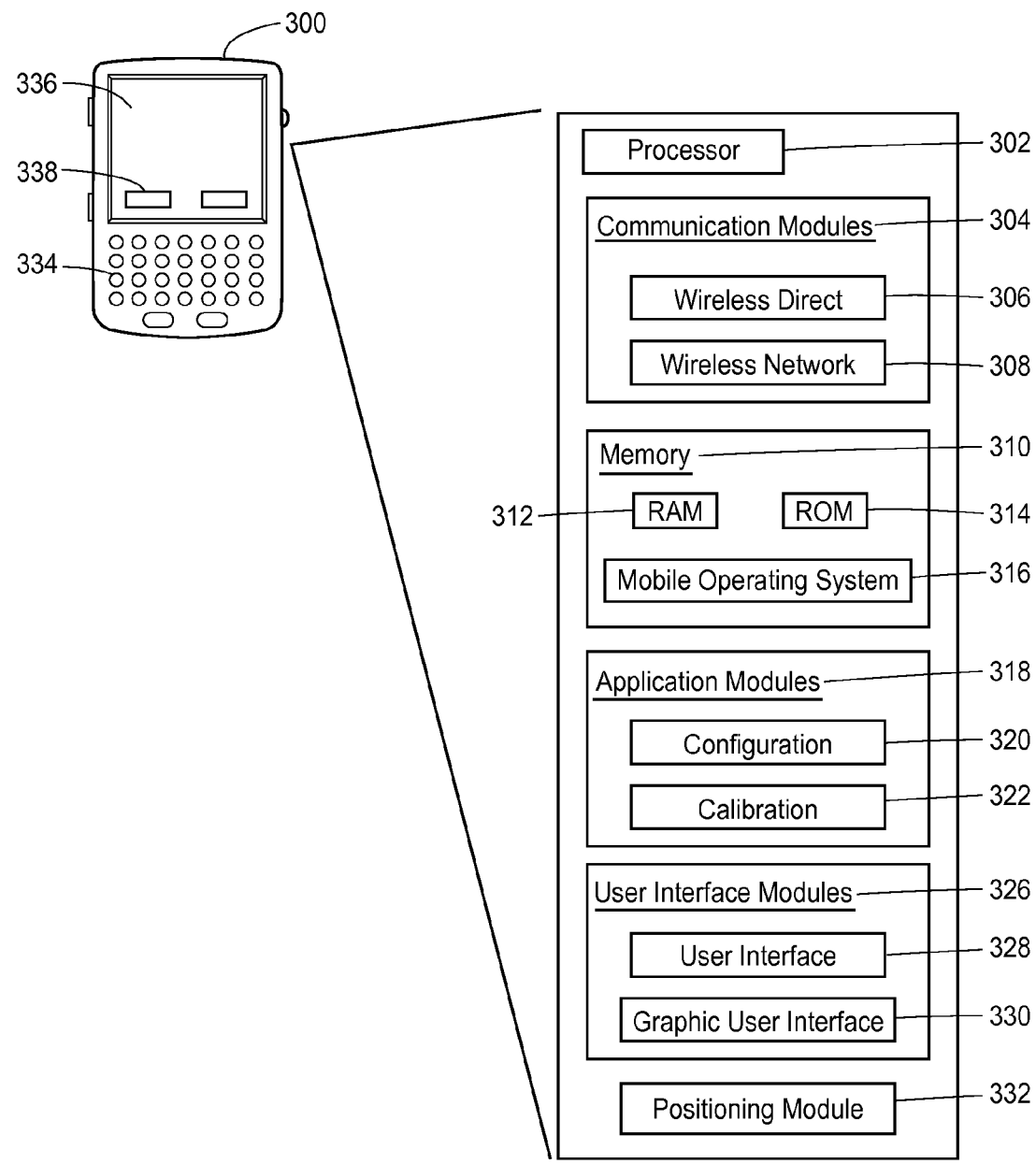
FIG. 3 is a block diagram of one embodiment of the mobile computing device for use with the system of FIG. 2.

In accordance with one embodiment of the invention, an exemplary mobile computing device 300 capable of wirelessly interacting with a field device of a control system is depicted in FIG. 3. In the following description, references are made to the mobile computing device 300 or a mobile telephony device. These terms are used to refer to a mobile device that is capable of downloading, installing, and running one or more application modules. The mobile computing device 300 may commonly be referred to as a smartphone and may typically include one or more functions of a personal digital assistant (PDA) with a mobile phone. For example, the mobile computing device 300 may include the functionality of a portable media player, digital camera, video camera, GPS navigation unit, configuration device, and/or calibration device. The multi-use mobile computing device 300 may also include a user interface, such as a keyboard and/or a touch-sensitive screen, as well as a web browser capable of displaying standard and mobile-optimized web pages and sites. The mobile computing device 300 is also capable of high-speed data access provided by Wi-Fi and Mobile Broadband technology as well as obtaining and/or interacting with telephony services and protocols, such as TDMA, CDMA, GSM, and VoIP telephony. Some examples of the mobile computing device 300 include Blackberry™, iPhone™, iPad™, Nexus™ and the like.

The mobile computing device 300 may include a processor 302 operatively coupled to: a mobile operating system (MOS) 316, one or more communication modules 304, a memory device 310, application modules 318, user interface modules 326, and a positioning module 332. The mobile operating systems (OS) 316 installed on the mobile computing device 300 may include any type of operating system capable of operating a mobile computing device, including, and not limited to: Google's Android, Apple's iOS, Nokia's Symbian, RIM's BlackBerry OS, Samsung's Bada, Microsoft's Windows Phone, Hewlett-Packard's webOS, and embedded Linux distributions such as MeeGo, Maemo, and Moblin.

The memory device 310 of the mobile computing device 300 may include a random access memory component (RAM) 312 and a read only memory component (ROM) 314. Other memory components or types may also be included within the mobile computing device 300, such as, and not limited to, programmable read only memory (PROM), erasable programmable read only memory (EPROM), Flash memory, dynamic random access memory (DRAM), static random access memory (SRAM), magneto-resistive RAM (MRAM), and Phase change RAM, (P-RAM, PCM).

Stored on the memory 310 of the mobile computing device 300 may be one or more application modules 318 capable of being executed by the processor 302. The application modules 318 may be provided to the mobile computing device 300 via the communication modules 304. In particular, the application modules 318, which may initially be stored on a remote device operatively coupled to the wireless communication network, may be retrieved via a wireless network communication module 308 from the remote device. The remote device may include a memory device or component capable of storing application modules, such as a database, client device, server device, or another mobile computing device. The wireless communication network may be a wide area network (WAN), such as a telecommunication network or the Internet, which may utilize private and/or public network transports. The telecommunication network may utilize fixed-line networks and wireless networks, and may also incorporate leased lines, circuit switching, packet switching, and/or cell relay, to transmit information and/or data hundreds and thousands of miles.

When the application module 318 is executed on the processor 302 of the mobile computing device 300, the application module 318 may perform one or more functions. For example, the execution of a configuration module 320 may facilitate configuring a particular field device for operation within the control system. Execution of another application module 318, such as a calibration module 322, may facilitate the calibration of a particular field device within the control system. While the functions of configuring and calibrating may include different steps, similar steps may be common among the two functions. It is therefore to be understood that configuring may include calibrating, and that calibrating may include configuring, and that the functions of configuring and calibrating may be used interchangeably unless it is obvious that it is meant otherwise.

A wireless direct communication module 306 facilitates direct wireless communication between the mobile computing device 300 and the particular field device of the control system. The wireless direct communicate module 306 may configure a personal area network (PAN) or wireless personal area network (WPAN) to exclusively interconnect the mobile computing device 300 to the particular field device. Bluetooth and Infrared Data Association (IrDA) may be used to wirelessly interconnect the mobile computing device 300 and the particular field device. Other wireless communication protocols may also be utilized to establish the exclusive wireless communication between the mobile computing device 300 and the particular field device, for example, Bluetooth smart, ANT+, Wi-Fi Direct, near field communication, and radio-frequency identification (RFID) protocols.

The user interface modules 326 of the mobile computing device 300 facilitate interaction between control system personnel and the control system. In particular, a user interface (UI) 328 may include a keyboard 334 and a display screen 336. The display screen 336 may be responsive to touch and include one or more touch pads 338. Control personnel may interact with the execution of the application module 318 by providing information such as inputs to the application module via the keyboard 334 and display screen 336. Control personnel may also receive information such as outputs from the application module via the display screen 336. The information provided on the display screen 336 may be manipulated by control personnel via the user interface 326. In particular, various amounts and types of information may be compared, arranged, presented, or displayed in various forms, such as charts, tables, figures. The UI 328 may also include a track-pad, track-ball, thumbwheel, and the like, which may be integrated and/or incorporated with other user interface modules 326. Another user interface module 326 may be a graphic user interface (GUI) 330, such as a software module that may be stored in the memory 310 of the mobile computing device 300. For clarity, the GUI 330 is depicted in FIG. 3 as a separate module. However, the GUI 330 may be provided in any suitable form. For example, the GUI 330 may include a library of application modules 318 that may be invoked via a predefined application programming interface (API), a script that the application may interpret at runtime, or another separate application module.

The mobile computing device 300 may also include a positioning module 332 or mobile positioning unit (MPU) that incorporates a locating technology component such as networked-based, global positioning system (GPS), or manual entry by control system personnel, to attain a geographic or physical location or position. In some instances, the positioning module 332 may operate as a component or a function of a Wi-Fi communication module, for example. Application modules attained by the mobile computing device 300 may be associated with the geographical location of the mobile computing device and/or the nearby field device. For example, the application modules accessible via the wireless communication network may be associated with one or more geographical locations. When the mobile computing device 300 attains the application module 318, such as the configuration module 320 or the calibration module 322, from the wireless network, the geographical location of the mobile computing device 320 may be used to acquire a particular application module associated with the particular geographical location of the mobile computing device and/or the field device located near the mobile computing device. In this way, control system personnel may control the use of a particular application module with a particular field device by matching or associating compatible or applicable application modules with compatible or applicable field devices.

Figure 4:
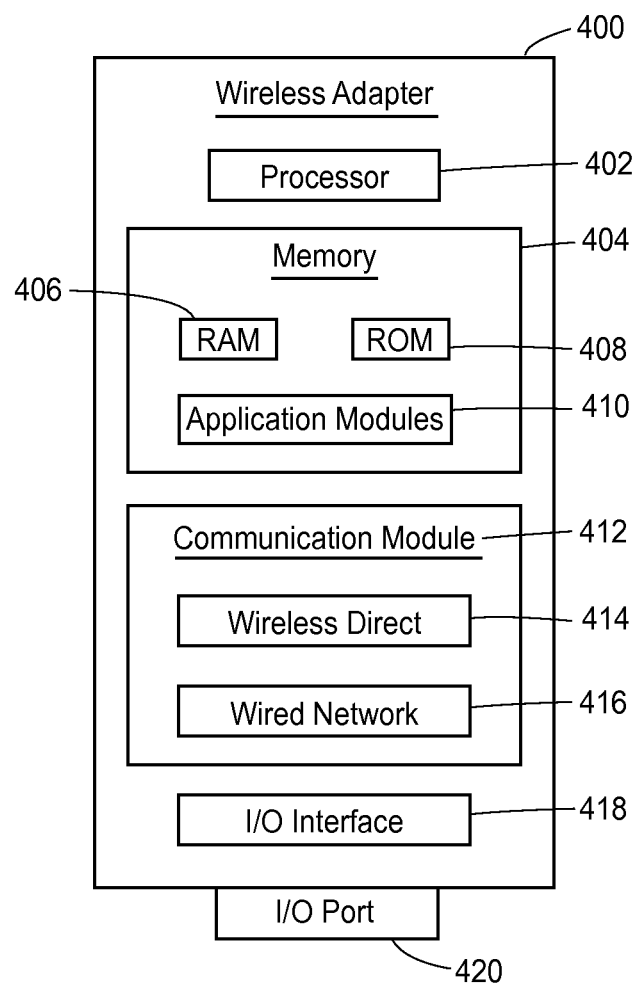
FIG. 4 is a block diagram of one embodiment of the wireless adapter for use with the system of FIG. 2.

An embodiment of the wireless adapter 400 utilized in cooperation with the mobile computing device during execution of the application module is shown in FIG. 4. The wireless computing device 400 facilitates communication between the mobile computing device and the field device of the control system. The wireless adapter 400 is operatively coupled to the field device and may be integrated within the circuitry of the field device or attached internally or externally to the field device (see for example, FIG. 2). The source of power for the wireless adapter 400 may be provided by a battery or the field device. Common energy-saving techniques may be employed to power the wireless adapter 400, wherein timers, sleep modes, sensors, and the like may be used. The wireless adapter 400 includes a processor 402 operatively coupled to a memory device 404, a communication module 412, an I/O interface 418, and an I/O port 420.

The communication module 412 of the wireless adapter 400 includes a wireless direct communication module 414 capable of cooperating with the wireless direct communication module 306 of the mobile computing device 300 to facilitate transmission of wireless information between the mobile computing device and the field device. When the mobile computing device executes an application module, information may be transmitted between the mobile computing device and the field device via cooperation between the wireless direct communication module 414 of the wireless adapter 400 and the wireless direct communication module 308 of the mobile computing device 300. That is, the wireless adapter 400 may exclusively interact with the mobile computing device 300 via Bluetooth, Bluetooth smart, ANT+, IrDA, Wi-Fi Direct, near field communication, WPAN, or radio-frequency identification (RFID) protocols. While this embodiment of the invention describes the wireless adapter 400 having a single wireless direct communication module 414, it is contemplated that other embodiments of the invention may be practiced with wireless adapters that include a plurality of wireless direct communication modules that enable communication in accordance with a plurality of distinct wireless process communication protocols.

The memory device 404 of the wireless adapter 400 may include random access memory (RAM) 406, read only memory (ROM) 408, and/or any other type or component of electronic memory, for example, PROM, EPROM, Flash memory, DRAM, SRAM, MRAM, P-RAM, and PCM. Stored on the memory device 404 of the wireless adapter 400 may be one or more application modules 410. The application modules 410 may be received from the mobile computing device 300 via cooperation between the wireless direct communication module 414 of the wireless adapter 400 and the wireless direct communication module 306 of the mobile computing device 300. In addition to the application module being executable by the mobile computing device 300, the processor 402 of the wireless adapter 400 may execute the application module, wherein one or more functions such as configuring or calibrating a particular field device of the control system may be performed. Information related to the execution of the application module 410 by the processor 402 of the wireless adapter 400 may be wirelessly communicated directly to the mobile computing device 300 via cooperation of the wireless direct communication module 414 of the wireless adapter 400 and the wireless direct communication module 306 of the mobile computing device 300.

The wireless adapter 400 may include another communication module 412, such as a wired network communication module 416, to facilitate wired communication between the field device and the controller of the control system. The wired network communication module 416 is capable of providing a communication medium between a particular field device associated with the wireless adapter 400 and the network communication bus of the control system. An I/O interface 418 and/or an I/O port 420 may be coupled to one or more components of the particular field device, such as a sensor or valve, wherein related control and/or data information may be provided to the wired network communication module 416.

The wireless adapter 400 may also include a positioning module (not shown) or mobile positioning unit (MPU) that incorporates a locating technology component such as networked-based, global positioning system (GPS), or manual entry by control system personnel, to attain a geographic or physical location or position of the wireless adapter. In some instances, the positioning module may operate as a component or a function of a Wi-Fi communication module, for example. Application modules 410 stored on the memory 404 of the wireless adapter 400 or executed by the processor 402 of the wireless adapter may be required to be associated with the location of the wireless adapter and/or the field device. For example, application modules including an association with the geographical location of the wireless adapter 400 and/or field device located near the wireless adapter may be stored in the memory 404 of the wireless adapter and/or executed by the processor 402 of the wireless adapter. In this way, control system personnel may control the use of a particular application module with a particular wireless adapter or field device by matching or associating compatible or applicable application modules with compatible or applicable wireless adapters or field devices.

Figure 5:
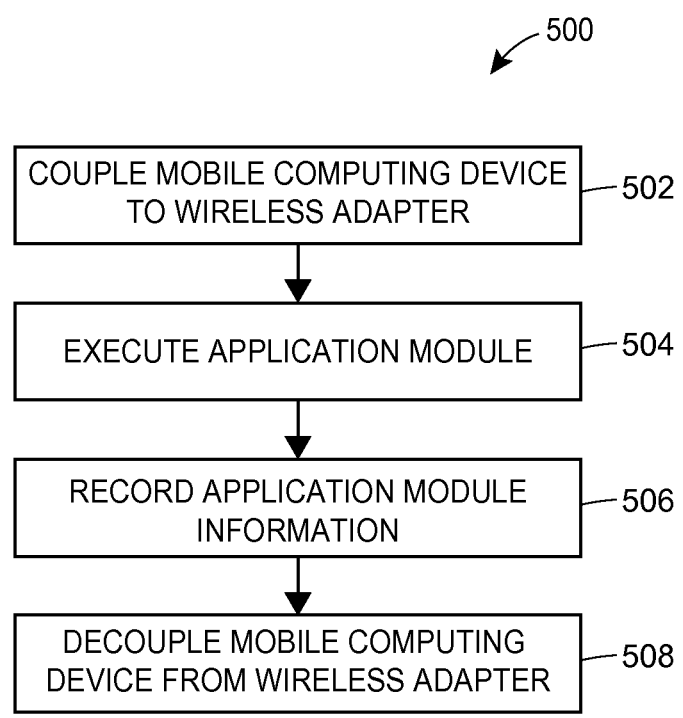
FIG. 5 is a flow diagram of an exemplary method of configuring a field device in accordance with the teachings of the invention.

FIG. 5 depicts a flowchart 500 of an example method of the invention that may be used with any of the configurations of the invention described above. The mobile computing device is wirelessly coupled to the wireless adapter (block 502). The coupling of the mobile computing device and the wireless adapter may occur in accordance with any direct wireless communication protocol, such as, Bluetooth, Bluetooth smart, ANT+, IrDA, Wi-Fi Direct, near field communication, WPAN, or radio-frequency identification (RFID) protocols. For example, either or both the mobile computing device and the wireless adapter may search or seek other compatible wireless devices within a particular range. Upon identifying another compatible wireless device, the devices may engage in a mutual connection protocol wherein either or both devices may acknowledge each other and connect upon confirmation. After the mobile computing device and the wireless adapter have been wirelessly connected, an application module is executed (block 504). The application module may include a routine for configuring a field device coupled to the wireless adapter. The application module may utilize one or more user interface modules of the mobile computing device to allow control personnel to interact via the touch-sensitive screen with the application module. Control personnel may set or amend one or more operations and/or parameters of the application module via the user interface of the mobile computing device. The application module may be executed on either or both processors of the mobile computing device and the wireless adapter. Information pertaining to the execution of the application module may be recorded (block 506), modified, and/or graphically displayed via the user interface module of the mobile computing device and/or stored in a memory device accessible to control system personnel. For example, the status or the results of the execution of the application module such as a configuration or calibration routine may be displayed on the screen of the mobile computing device. Various other data may also be acquired via interaction with the screen of the mobile computing device. After the application module has finished executing, the mobile computing device may be decoupled from the wireless adapter (block 508).

It is apparent from the description above that a mobile computing device, such as a smartphone, for example, may be utilized by control system personnel to configure a field device within a control system. The user interface module of the mobile computing device may provide a touch-sensitive graphic on the display screen. The graphic provides a user-friendly interface for control system personnel to interact with the application module for configuring the field device. Information previously displayed in a seemingly cryptic format at the field device via LED and LCD peripherals often requires codes and charts to decipher the acronyms and patterns of LEDs displayed on the peripherals. This information may now be clearly and graphically presented and manipulated on the screen of the wireless computing device. By reducing or eliminating the LED and LCD peripherals at the field device, associated costs and power consumption related to these peripheral devices can be significantly reduced. The wireless capability of the mobile computing device and the wireless adapter allows for messages or notifications associated with the application module to be received from the control system. The messages or notices sent to the mobile computing device may include information advising that an update to a particular application module is available. The messages, which may also include the updated application module, may be sent automatically to the mobile computing device from a control or distribution device. The messages may also be sent in response to a request for such information transmitted from the mobile computing device. The control or distribution device may provide for a single source to be utilized for storing the application modules and distributing the application modules via individual or broadcast messaging. The single source of application modules assists in ensuring the control and distribution of application modules for use within the control system. The wireless aspects of the invention also avoids the inherit process and time constraints associated with known handheld devices that must be physically connected to the source of the application modules as well as the field device.

Although certain example methods, apparatus and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the control system 10 may include, but is not limited to, any combination of a LAN, a MAN, a WAN, a mobile, a wired or wireless network, a private network, or a virtual private network. Moreover, while one workstation is illustrated in FIG. 1 to simplify and clarify the description, it is understood that any number of workstations or user interfaces are supported and can be implemented.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software), may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a plant environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a plant or office environment). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, for the purposes of illustration only, the figures depict preferred embodiments of a configuration system for a field device within a control system. One skilled in the art will readily recognize from the discussion above that alternative embodiments of the structures and methods illustrated herein may be employed without departing from the principles described herein.

What is claimed is:

1. A control system for controlling a process condition, the control system comprising:
   a field device coupled to the process and arranged to adjust a process condition;
   a sensor coupled to the process and arranged to monitor the process for an occurrence of an event trigger associated with the process condition;
   a wireless adapter operatively coupled to the field device;
   a remote device coupled to a wireless communication network and capable of storing one or more application modules, each of the one or more application modules associated with at least one geographic location;
   a mobile computing device including a processor, a memory device, a positioning module for determining a geographic location of the mobile computing device, a wireless network communication module, and a wireless direct communication module, the wireless network communication module coupled to the processor and permitting wireless communication between the mobile computing device and the remote device, the wireless direct communication module coupled to the processor and permitting direct wireless communication between the mobile computing device and the wireless adapter; and
   an application module associated with one or more geographic locations and received from the remote device via the wireless communication network, wherein when at least one of the one or more geographic locations associated with the application module matches the geographic location of the mobile computing device and/or the field device, the application module, when executed by the processor, permits the mobile computing device to configure the field device via the wireless direct communication module.

2. The control system of claim 1, wherein the application module is stored in the memory device of the mobile computing device.

3. The control system of claim 1, wherein the wireless adapter is integrated within the field device.

4. The control system of claim 1, wherein the wireless adapter is internally or externally attached to the field device.

5. A control system including a field device for controlling a process condition, the control system comprising:
   a mobile computing device including a positioning module for determining a geographic location of the mobile computing device, and a processor for facilitating the configuration of the field device;
   a remote device coupled to a wireless communication network and capable of storing one or more application modules, each of the one or more application modules associated with at least one geographic location;
   a wireless network communication module capable of facilitating wireless network communication on the wireless communication network between the mobile computing device and the remote device;
   a wireless adapter operatively coupled to the field device;
   a wireless direct communication module capable of facilitating wireless direct communication between the mobile computing device and the field device via the wireless adapter; and
   an application module associated with one or more geographic locations and received by the mobile computing device via the wireless network communication module, wherein when at least one of the one or more geographic locations associated with the application module matches the geographic location of the mobile computing device and/or the field device, the application module, when executed by the processor of the mobile computing device, permits the mobile computing device to configure the field device via wireless direct communication established between the mobile computing device and the wireless adapter.

6. The control system of claim 5, wherein the mobile computing device includes a memory device coupled to the processor and the application module is stored in the memory device.

7. The control system of claim 5, wherein the wireless adapter is integrated within the field device.

8. The control system of claim 5, wherein the wireless adapter is internally or externally attached to the field device.

9. A mobile computing device for configuring a field device of a control system, the field device being capable of wireless communication, the mobile computing device comprising:
   a processor for facilitating the configuration of the field device;
   a positioning module for determining a geographic location of the mobile computing device;
   a memory device coupled to the processor;
   a wireless network communication module permitting wireless network communication on a wireless communication network;
   a wireless direct communication module permitting wireless direct communication between the mobile computing device and the field device; and
   an application module associated with one or more geographic locations and received via the wireless network communication module, wherein when at least one of the one or more geographic locations associated with the application module matches the geographic location of the mobile computing device determined by the positioning module, the application module, when executed by the processor of the mobile computing device, permits the mobile computing device to configure the field device via wireless direct communication established between the mobile computing device and the field device.

10. The mobile computing device of claim 9, further comprising a user interface module.

11. The mobile computing device of claim 10, wherein the user interface module includes a touch-sensitive display screen.

12. A mobile computing device for configuring a field device of a control system, the field device being capable of wireless communication, the mobile computing device comprising:
   a processor for facilitating the configuration of the field device;
   a positioning module for determining a geographic location of the mobile computing device;
   a wireless direct communication module permitting wireless direct communication between the mobile computing device and the field device;
   an application module associated with a one or more geographic locations, wherein when at least one of the one or more geographic locations matches the geographic location of the mobile computing device determined by the positioning module, the application module, when executed by the processor, permits the mobile computing device to configure the field device via wireless direct communication established between the mobile computing device and the field device; and an interface module including a display screen for facilitating interaction with the application module.

13. The mobile computing device of claim 12, further comprising:
a memory device coupled to the processor, the application module stored on the memory device; and
a wireless network communication module permitting wireless network communication on a wireless communication network.

14. The mobile computing device of claim 13, further comprising;
a message received via the wireless network communication module, the message including information associated with the application module.

* * * * *